(12) United States Patent
Drescher

(10) Patent No.: US 7,779,229 B2
(45) Date of Patent: Aug. 17, 2010

(54) METHOD AND ARRANGEMENT FOR BRINGING TOGETHER DATA ON PARALLEL DATA PATHS

(75) Inventor: Wolfram Drescher, Dresden (DE)

(73) Assignee: NXP B.V., Eindhoven (NL)

( * ) Notice: Subject to any disclaimer, the term of this patent is extended or adjusted under 35 U.S.C. 154(b) by 647 days.

(21) Appl. No.: 10/505,028

(22) PCT Filed: Feb. 12, 2003

(86) PCT No.: PCT/DE03/00417

§ 371 (c)(1),
(2), (4) Date: Jun. 10, 2005

(87) PCT Pub. No.: WO03/071431

PCT Pub. Date: Aug. 28, 2003

(65) Prior Publication Data
US 2006/0090060 A1   Apr. 27, 2006

(30) Foreign Application Priority Data
Feb. 18, 2002  (DE) ............................... 102 06 830

(51) Int. Cl.
G06F 7/00 (2006.01)
(52) U.S. Cl. ................................. 712/7; 712/11; 710/1
(58) Field of Classification Search ................ 713/168; 712/4, 3, 22, 210, 20, 2, 215, 218, 235, 300, 712/7, 9, 16; 709/248; 710/100; 711/220
See application file for complete search history.

(56) References Cited

U.S. PATENT DOCUMENTS

| | | | | |
|---|---|---|---|---|
| 4,507,748 A | * | 3/1985 | Cotton | 708/518 |
| 5,129,092 A | * | 7/1992 | Wilson | 712/16 |
| 5,197,140 A | * | 3/1993 | Balmer | 711/220 |
| 5,317,753 A | * | 5/1994 | Kuenemund et al. | 712/7 |
| 5,371,896 A | * | 12/1994 | Gove et al. | 712/20 |
| 5,423,051 A | * | 6/1995 | Fuller et al. | 712/7 |
| 5,471,593 A | * | 11/1995 | Branigin | 712/235 |

(Continued)

FOREIGN PATENT DOCUMENTS

DE        19835216        2/2000

(Continued)

OTHER PUBLICATIONS

Goodman et al, An Energy-Efficient Reconfigurable Public_key Cryptography Processor, IEEE Journal of Solid-State Circuits, Nov. 2001, p. 1808-1820.*

(Continued)

*Primary Examiner*—Henry W. H. Tsai
*Assistant Examiner*—Cheng-Yuan Tseng
(74) *Attorney, Agent, or Firm*—Baker Botts L.L.P.

(57) ABSTRACT

A processor arrangement having a strip structure for parallel data processing is configured so that local data from the individual processing units or strips is brought together in a rapid manner. Input data, intermediate data and/or output data from various processing units are linked together in an operation which is at least partially combinatory. The data linking operation is not clock controlled. The linking of the local data from various strips in this manner reduces delays in parallel data processing in the processor arrangement. The combinatory data linking operation can provide an overall data linking outcome within an individual clock cycle.

7 Claims, 3 Drawing Sheets

U.S. PATENT DOCUMENTS

| | | | |
|---|---|---|---|
| 5,535,151 A * | 7/1996 | Kurokawa | 708/630 |
| 5,758,195 A * | 5/1998 | Balmer | 712/300 |
| 5,765,012 A * | 6/1998 | Wilkinson et al. | 712/16 |
| 5,765,015 A * | 6/1998 | Wilkinson et al. | 712/22 |
| 5,822,606 A | 10/1998 | Morton | 395/800.16 |
| 5,973,705 A * | 10/1999 | Narayanaswami | 345/505 |
| 6,038,584 A | 3/2000 | Balmer | 709/248 |
| 6,044,448 A * | 3/2000 | Agrawal et al. | 712/9 |
| 6,260,088 B1 * | 7/2001 | Gove et al. | 710/100 |
| 6,308,252 B1 * | 10/2001 | Agarwal et al. | 712/22 |
| 6,401,194 B1 * | 6/2002 | Nguyen et al. | 712/210 |
| 6,404,439 B1 * | 6/2002 | Coulombe et al. | 345/505 |
| 6,557,097 B1 * | 4/2003 | Clave et al. | 712/222 |
| 6,625,722 B1 * | 9/2003 | Lancaster | 712/16 |
| 6,636,828 B1 * | 10/2003 | Hachiya | 703/2 |
| 6,665,790 B1 * | 12/2003 | Glossner et al. | 712/4 |
| 6,675,268 B1 * | 1/2004 | DeKoning et al. | 711/151 |
| 6,732,253 B1 * | 5/2004 | Redford | 712/22 |
| 6,763,450 B1 * | 7/2004 | Miyaguchi et al. | 712/215 |
| 6,839,831 B2 * | 1/2005 | Balmer et al. | 712/218 |
| 6,968,445 B2 * | 11/2005 | Hokenek et al. | 712/222 |
| 7,197,625 B1 * | 3/2007 | van Hook et al. | 712/2 |
| 7,394,052 B2 * | 7/2008 | Fujii et al. | 250/208.1 |
| 2001/0010073 A1 * | 7/2001 | Janik et al. | 712/218 |
| 2004/0015931 A1 * | 1/2004 | Larin et al. | 717/158 |

FOREIGN PATENT DOCUMENTS

| | | |
|---|---|---|
| JP | 06-290262 | 10/1994 |
| JP | 08-030577 | 2/1996 |

OTHER PUBLICATIONS

Goodman et al., An Energy-Efficient IEEE 1363-based Reconfigurable Public-Key Cryptography Processor, 2001, ISSCC 2001, pp. 1-4.*

Drescher et al., An Architectural Study of a Digital Signal Processor for Block Codes, 1998, IEEE, pp. 3129-3132.*

Satoh et al., A High-Speed Small RSA Encryption LSI with Low Power Dissipation, 1998, IBM, pp. 174-187.*

* cited by examiner

METHOD AND ARRANGEMENT FOR BRINGING TOGETHER DATA ON PARALLEL DATA PATHS

CROSS REFERENCE TO RELATED APPLICATIONS

This application claims the benefit of International Patent Application No. PCT/DE03/00417 filed Feb. 12, 2003, which claims priority to German Patent Application No. 102 06 830.5 filed Feb. 18, 2002, both of which applications are hereby incorporated by reference in their entireties herein.

FIELD OF THE INVENTION

The invention relates to data flow in parallel data processing arrangements. In particular, the invention relates to systems and methods for splitting data for parallel processing and recombining processed split data.

BACKGROUND OF THE INVENTION

Processors for parallel data processing have long been known. A characteristic of common parallel processor architecture is the provision of a plurality of processing units, by which parallel processing of data can be accomplished. Such an architecture and processing unit assigned method are described, for example, in German Letters of Disclosure DE 198 35 216. This German Letters of Disclosure describes data in a data memory being split into data groups with a plurality of elements and stored under one and the same address. Each element of a data group is assigned to a processing unit. All data elements are simultaneously read out of the data memory in parallel and distributed as input data to one or more processing units, where they are processed in parallel under clock control. The parallel processing units are connected together via a communication unit. A processing unit comprises at least one process unit and one storage unit, arranged in a strip. Each strip in the processing unit is generally adjacent to at least one additional strip of like structure.

Such processor units may be referred to as Single Instruction Multiple Data (SIMD) vector processor. In SIMD processors, the respective data elements are processed in the parallel data paths (i.e. strips) as described above. Depending upon the program to be processed, the partial results may be written in the group memory as corresponding data elements or as data groups. Under some circumstances, however, it may be necessary to bring together processed data from parallel data paths. For example, in the performance of an algorithm on the vector processor, it may be necessary to link together into a global intermediate result data calculated locally from a plurality of strips or alternatively from all strips. For this purpose, in prior art, the partial results of the strips have been calculated with the aid of a program over a plurality of clock cycles in order to obtain the desired intermediate result. If this global intermediate result is required for subsequent calculations of the algorithm, calculation of the end result is delayed.

Consideration is now being given to improved parallel processing methods and arrangements. The desirable processing methods and arrangements achieve higher processing speeds, for example, by incorporating processor functionality that permits local data from individual data strips to be linked without requiring a great expenditure of time.

SUMMARY OF THE INVENTION

Parallel processing methods and processor arrangements are provided for achieving high data processing speeds. The inventive methods and processor arrangements are configured so that input, intermediate and/or output data of a variety of processing units can be linked via at least one section wise combinatorial operation, which is not a clock-controlled operation.

With the provision of a combinatorial linking operation that is not clock-controlled, data elements or groups assigned to a variety of processing units can be quickly brought together in a surprisingly quick and simple manner. With the combinatorial linking operation the necessary linkage of data does not significantly delay parallel data processing in the processor arrangement. In particular, it may be possible with the combinatorial operation to provide the total result of data linkage within a single clock cycle. This feature is especially advantageous when data from all processing units are linked by the linking operation in order to provide accelerated processing of specific algorithms that run on the processor arrangement.

The combinatorial linking operation may be deployed in either logical and/or arithmetic operations. Thus, all possible linkages of data from a variety of processing units and parallel data paths can be obtained in accordance with the principles of the present invention.

In an implementation of the invention, the combinatorial linking operation may involve a redundant numeric representation in at least one partial step. In particular, in the performance of arithmetic operations such as addition or subtraction, carries at all positions of the data can be conducted or performed simultaneously and used for the next partial step. There is no need to perform carry individually within the partial step of the operation, which would delay the processing for subsequent positions. Thus, the carry vector can propagate almost as rapidly as the sum vector within a partial step. Any delay due to a "ripple" effect can occur only in the last partial step operation in which the sum and carry vectors are brought together.

In order to meet all possible requirements of any desired algorithm, a single data element or alternatively a data group is produced as the result of linkage of the local data in accordance with the principles of the present invention. Any desired data sources from the various strips can be linked together and the result fed to any desired data sinks of the processor arrangement.

In an advantageous implementation of the invention, the result of the linking operations can be fed back to a processing unit, which enables, for example, recursive algorithms to be performed more rapidly.

In another implementation of the invention utilizing a plurality of installed combinatorial operations that are not clock-controlled, a single one can be selected for bringing together data. In this way, a plurality of algorithms and/or complex algorithms with a plurality of various assemblies of local data can be converted in a processor arrangement.

The inventive processor arrangements include at least a section wise combinatorial linkage arrangement, which is not a clock-controlled linkage arrangement. The combinatorial linkage arrangement can link together data from a variety of strips, and in particular can link together input, intermediate and/or output data of a variety of processing units. The inventive processor arrangements permit the assembly of local data from a variety of strips required for certain algorithms to be performed more rapidly than in the prior art. Delays that occur in conventional parallel data processing are avoided.

In a version of the inventive processor arrangements, the linkage arrangement may comprise an addition network, subtraction network and/or a network for minimum/maximum formation. Such networks are capable of ascertaining the carry at a position of the data resulting in a specific step of the performance the operation in the logic arrangement, independently of the results of preceding positions or steps. The linkage arrangement may be designed so that carries occurring in all or almost all partial steps are not used for the calculation of subsequent positions. Thus in only part of the linkage network in which a sum vector and a carry vector are brought together does a known delay occur.

In a linkage network for minimum/maximum formation via a plurality of strips, it may be advantageous to pass on between calculation steps an index, which represents or indicates the strip with an extreme data value, in addition to the extreme data value itself.

In accordance with the principles of the invention, a processor arrangement for linkage of a wide variety of data within a data path or strip with data from other data path or strips may include have a plurality of selectable linkage arrangements of various types. The selection of appropriate linkage arrangements of various types may be program controlled. By suitable selection of the linking arrangements, it may be possible to link the same data variably, logically or arithmetically.

A deployed linking arrangement may be configured so that its output may be connected with any desired registers of the processor arrangement. The linking arrangement output may, for example, be connected to a register of a processing unit, or alternatively with a global register in which a data group is capable of being filed or stored.

In order to avoid unnecessary energy consumption in the processor circuits, at least one input register of the linkage arrangement may be assigned a control mechanism or switch which can be operated to separate the input register and hence its data from the linkage arrangement. Since the linkage arrangement operates at least section wise combinatorially in a manner that is not clock-controlled, changes at the data input of the linkage arrangement can be prevented from automatically impacting the linkage arrangement, even though this is not necessary and/or all input data are not yet present at the given moment.

BRIEF DESCRIPTION OF THE DRAWINGS

Further features of the invention, its nature, and various advantages will be more apparent from the following detailed description and the accompanying drawings, wherein like reference characters represent like elements throughout, and in which.

Figure 1:
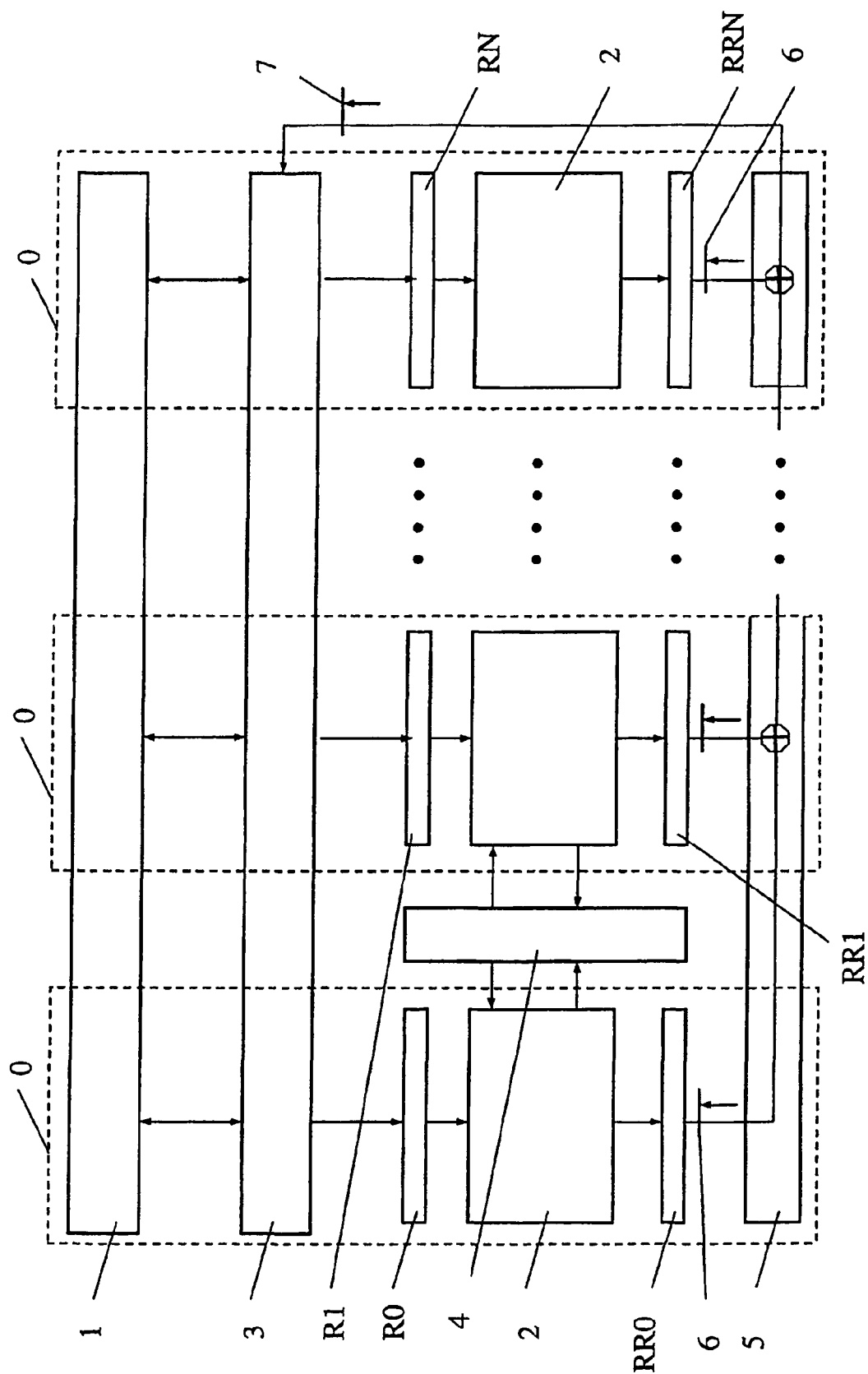
FIG. 1 is a schematic representation of processor architecture in accordance with the principles of the present invention.
Figure 2:
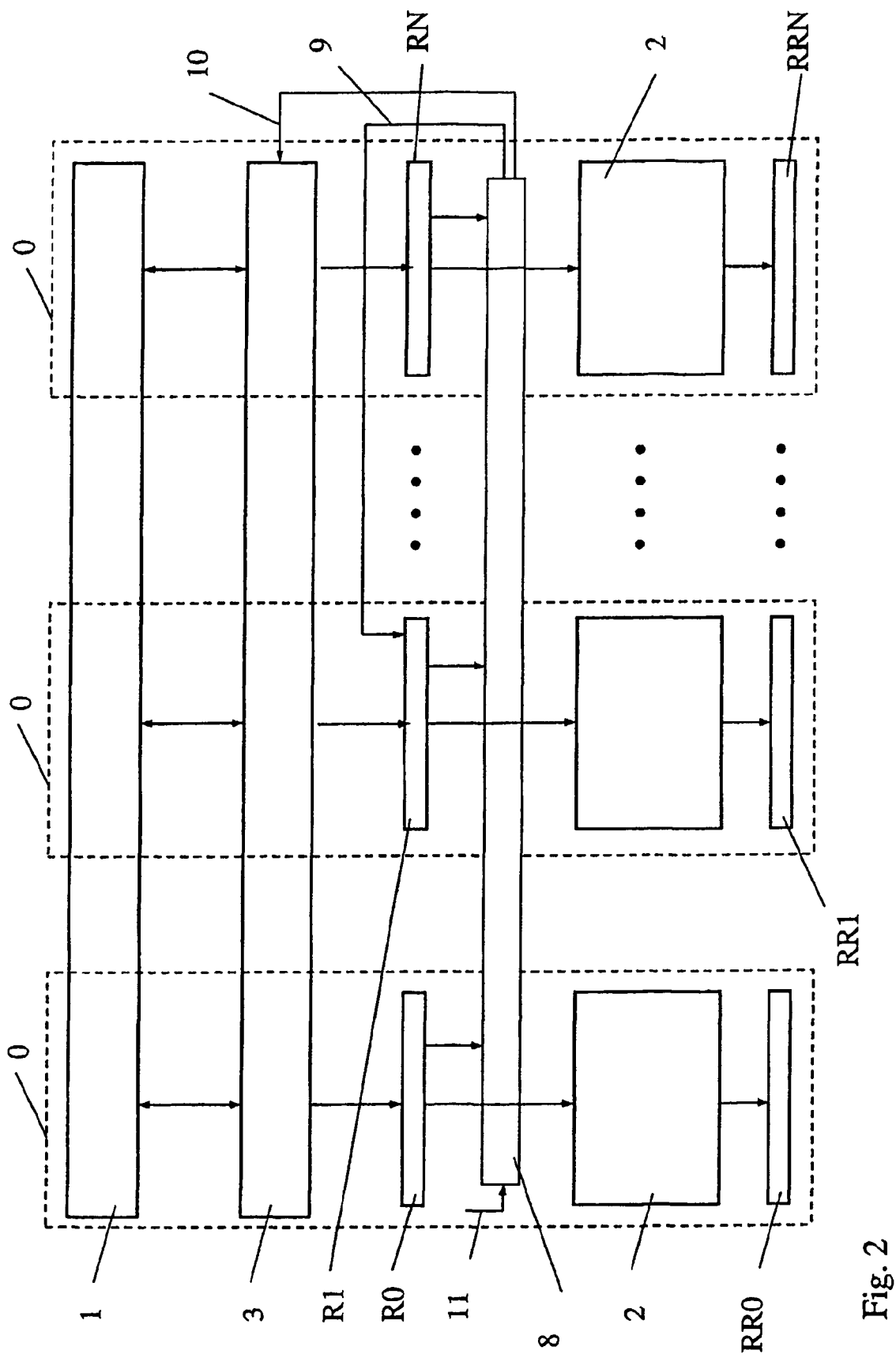
FIG. 2 is a schematic representation of another processor architecture in accordance with the principles of the present invention.
Figure 3:
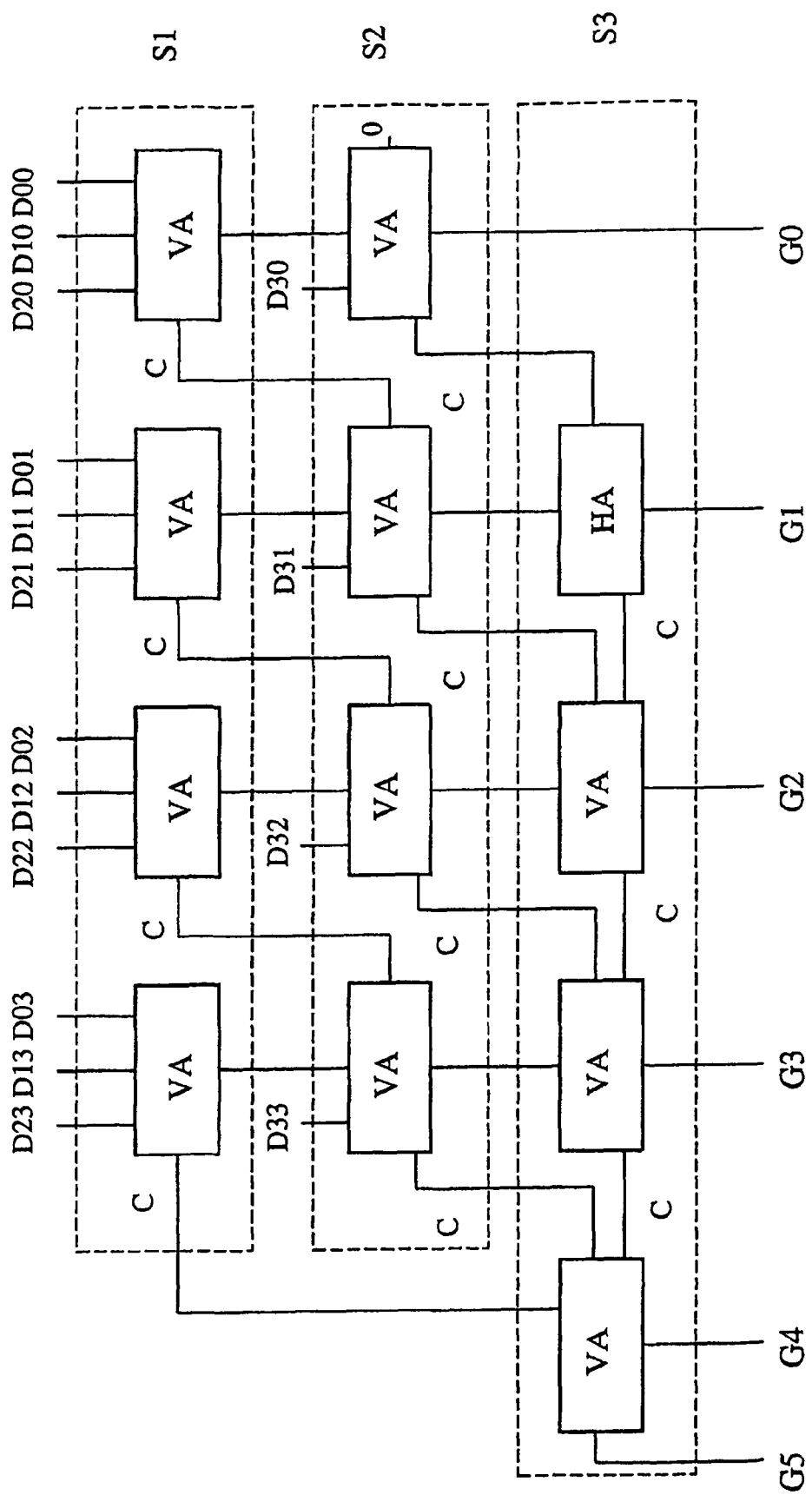
FIG. 3 is a schematic representation of an exemplary linkage arrangement for the linkage of data from a variety of parallel data paths, in accordance with the principles of the present invention.

The following is an index of the reference numerals and labels that are used in FIGS. 1-3 to identify drawing elements.

REFERENCE NUMBERS AND LABELS INDEX 0 strip
1 group memory
2 processing unit
3 global communication unit
4 local linkage arrangement
5 global linkage arrangement
6 control means/latch
7 control means
8 global linkage arrangement
9 local data feedback
10 global data feedback
11 control line for global linkage arrangement
S1 first step of an addition network
S2 second step of an addition network
S3 third step of an addition network
Ri input register (i=0 ... N)
RRi output register (i=0 ... N)
Di data word (i=0 ... 3)
VA full adder
HA half adder
C carry of a full adder
Gj $j^{th}$ position of the sum (j=0 ... 5)

DESCRIPTION OF THE INVENTION

Parallel processing methods and arrangements are provided for improving the speed of data processing. The parallel processing arrangements are configured with data linking arrangements so that processed data from individual data processing strips or processing units can be linked or brought together without requiring a great expenditure of time.

FIG. 1 shows a schematic representation of an exemplary processor arrangement designed in accordance with the principles of the present invention. The processor arrangement includes a plurality of parallel data processing strips (0). Further the processor arrangement includes a group memory 1, in which data groups are capable of being stored under one address, where a single data group has a plurality of data elements. Processing units 2, each with an input register $R_0 \ldots R_N$ and an output register $RR_0 \ldots RR_N$, are arranged in a strip structure. In an alternate version of the inventive processor arrangement, the registers may be designed as a register set, which includes a plurality of input and output registers.

With continued reference to FIG. 1, a global linkage arrangement 5 is inserted after the output registers $RR_0$ to $RR_N$. Global linkage arrangement 5 is designed to be a combinatorial addition network in the input step. Global linkage arrangement 5 is not clock controlled. Further, a global communication unit 3 may be disposed between processing units 2 and group memory 1. Data from group memory 1 may be fed to the respective processing units 2 via communication unit 3. Additionally or alternatively, it is possible that a data group or at least one element of the data group may be connectable directly with the assigned processing units bypassing the communication unit. A data group is simultaneously read out of the data memory in parallel and distributed to a plurality of processing units 2 for processing in parallel. The processing units 2 in each instance include at least one process unit and one arithmetic logic unit (not shown).

In versions of the processor arrangement where the registers are designed as register sets, at least one input linkage logic and at least one output linkage logic with which the registers of a register set are connectable within a data path, may additionally be arranged between a processing unit and the assigned input register set and output register set.

In operation, as previously described, each element of a data group from the group memory 1 may be sent either directly to the assigned processing unit or via communication unit 3 to be distributed to other processing units. The sent data reach the respective processing units 2 via input registers $R_0 \ldots R_N$. Then, the data results of processing units 2 are written in respective output register $RR_0 \ldots RR_N$. These result data may in turn be written directly in the group memory 1 or be distributed by means of the communication unit 3.

A local linkage arrangement 4 is disposed between adjacent processing units 2. Local linkage arrangement may be utilized to link data from two adjacent processing units 2 in a combinatorial manner that is not clock-controlled. The linkage results may be written back to either one of the two processing units. In exemplary local linkage arrangement 4, the two data elements are XOR-linked via a combinatorial, which is not a clock-controlled network. Accordingly, no additional clock cycle is necessary for ascertainment of the result, and the processing unit in which the result is further processed experiences no internal delay.

As explained above, all output registers $RR_0 \ldots RR_N$ are connected with the global linkage arrangement 5, in which the individual output data of all (N+1) processing units 2 are added. The addition network of the linkage arrangement 5 is represented in FIG. 3 as a four-strip processor arrangement where, for the sake of simplicity of representation, four bit-data words are added in the linkage arrangement.

FIG. 3 shows operation of the linkage arrangement in rows S1-S3. In FIG. 3 a data word position are labeled as Dij, where the index i identifies the data word (i.e., the strip) and j identifies the data word position. In a first step at row Sl, the individual bits of three data words D0-D2 from the registers $RR_0$, $RR_1$ and $RR_2$ are added by means of four full adders VA. The results of each adder are given in a second step to an assigned full adder VA at row S2. Also, the carries C to the full adders of the next position are given to assigned full adders VA (e.g., step S2). The respective bit of the fourth data word D3 from the register $RR_3$ of the fourth strip is also shown as being present in the four full adders VA at the second row S2. Since, in the first and second steps at rows S1 and S2 of the linkage arrangement, the carry C is not transferred to the full adders of the subsequent data word position, all calculations in both steps S1 and S2 can be performed simultaneously and immediately with the data fed to the inputs of the full adders. Only in the last step at row S3, which includes a half adder HA and three subsequent full adders VA, are the carries C of a lower data word position sent or transferred on to the full adder of the subsequent position. In this manner, the linkage arrangement shown in FIG. 3 can be accomplished by three transfers within the last partial step (S3), which is easily performed in a single clock cycle. As a result, a 6-bit data word G (G0-G5) is produced in a last step of the linking arrangement, by bringing together a carry and a sum vector. The higher positions of the result word G are filled with zeros for the formation of a data group (not shown) and may be fed via the control means 7 into global communication unit 3, from which the calculated data group is either stored in the group memory or distributed to the processing means.

Since the first two steps at rows S1 and S2 are performed combinatorially and are not clock-controlled, each input of the global linkage arrangement 5 may have a controllable gate 6 in the form of a latch by which a change in the output registers $RR_1 \ldots RR_N$ can be fed into the global linkage arrangement 5. With this configuration of global linkage arrangement 5, a change in an output register of a processing unit is precluded from automatically causing global linkage arrangement 5 to link data, which is always associated with the consumption of energy. In this way, the linkage of data can be moved to such time at which the data brought together in the linkage arrangement are required or such time after all input data are present.

Other versions of the combinatorial linkage arrangement may include the provision of an additional XOR-linkage as a subtraction network or may comprise a shift arrangement or an inverter.

In an implementation of the invention, a processor arrangement includes a linkage arrangement for maximum formation is designed via a plurality of strips. The arrangement has a plurality of calculation steps, in which the data of two strips are in each instance subtracted from one another. If the result is negative, the subtrahend is sent on to the next calculation step. If the result is positive, the minuend is sent on to the next calculation step. At the same time, an index to this calculation step is transmitted, which indicates the strip in which of the strips thus far considered the extreme lies. In a maximum formation over 8 strips, an index of 3 bits and 7 calculation steps are thus required. These may be processed cascade-like, but may alternatively be designed for at least partially processing in parallel.

FIG. 2 shows a schematic representation of another exemplary processor arrangement designed in accordance with the principles of the present invention. In the processor arrangement of FIG. 2, a global linkage arrangement 8 is connected with the input registers $R_0 \ldots R_N$. The linkage arrangement 8 includes two separate and independent logic arrangements. Any one of which may be selected by means of the control line 11. The first logic arrangement produces a data group that is fed back via the global data feedback 10 into the global communication unit 3. In the second logic arrangement, on the other hand, a data element is produced which is fed back via the local data feedback 9 into the input register R1 of the processing unit 2 of the second strip.

The invention claimed is:

1. A method for bringing together data from parallel data paths in a processor arrangement, wherein data in a data memory are split and stored in data groups with a plurality of elements under one and the same address, read out from the latter and fed to processing units, wherein each element of a data group is assigned a processing unit and all elements of a data group are read out of the data memory simultaneously and in parallel and distributed as input data to the processing units and in the latter are processed clock-controlled in parallel, the method comprising the step of:

directly linking output data from the processing units using at least one operation which is combinatorial and which is not clock-controlled, wherein the using at least one operation comprises using a redundant numerical representation at least one partial step of the operation so that carries in all positions of the data are formed simultaneously and used for the next partial step; and feeding back a produced data element or data group result of the operation into at least one of the processing unit or into a register assigned to this processing unit.

2. A processor arrangement for parallel, clock-controlled data processing with a data memory designed as group memory and parallel processing units, which are connected together via a communication unit, wherein at least one data group with a plurality of elements is stored in the group memory under one address and each data element is assigned a processing unit, the processor arrangement comprising:

at least one process unit and at least one memory unit, which are located in a strip that is adjacent to at least an additional strip of like structure;

a programmed controlled combinatorial linkage arrangement comprising at least one of an addition network, a subtraction network, and a network for minimum/maximum formation, and in which network the carry in a specified linking step is ascertainable at a position of the data independent of the preceding positions, which is not clock-controlled and which directly links together data from the strips, wherein the data comprises output data from the processing units, wherein at least one data element or data group output register of the linkage arrangement is assigned a control latch by which the register data are separable from the linkage arrangement.

3. The method of claim 1 comprising linking data of all processing units.

4. The method of claim 1 further comprising producing a data element or a data group as the result of using the at least one operation.

5. The method of claim 1 wherein using at least one operation comprises selecting one of a plurality of combinatorial operations that are not clock- controlled operations.

6. The processor arrangement of claim 2 comprising a plurality of such linkage arrangements, wherein a selection of the linkage arrangements is program-controlled.

7. The processor arrangement of claim 2 wherein an output of the linkage arrangement is connected with a register of a processing unit or a register assigned to a data group.

\* \* \* \* \*